F. Peabody,
Wind Wheel,

N°15,193  Patented June 24, 1856.

UNITED STATES PATENT OFFICE.

FRANCIS PEABODY, OF SALEM, MASSACHUSETTS.

SELF-REGULATING WIND-WHEEL.

Specification forming part of Letters Patent No. 15,193, dated June 24, 1856.

*To all whom it may concern:*

Be it known that I, FRANCIS PEABODY, of Salem, in the county of Essex and State of Massachusetts, have invented a new and Improved Method of Regulating the Speed of Wind-Wheels to the Varying Force of the Wind, of which the following is a full, clear, and exact description, reference being had to the annexed drawings, making part of this specification, in which—

Figure 4:
Figure 5:
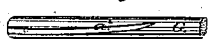
Figure 3:
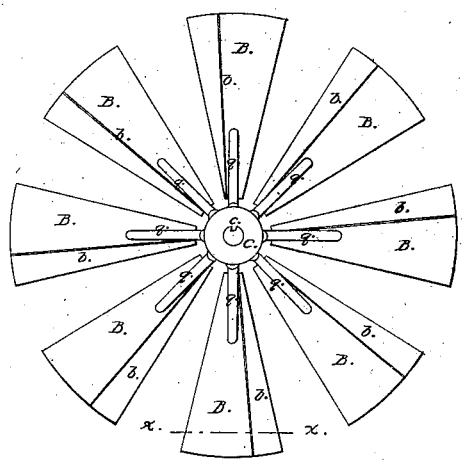
Figure 6:
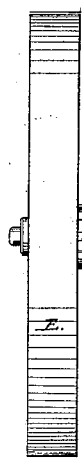
Figure 6:
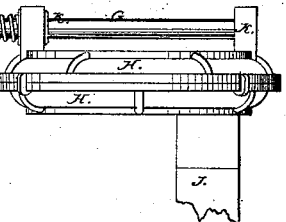
Figure 1:
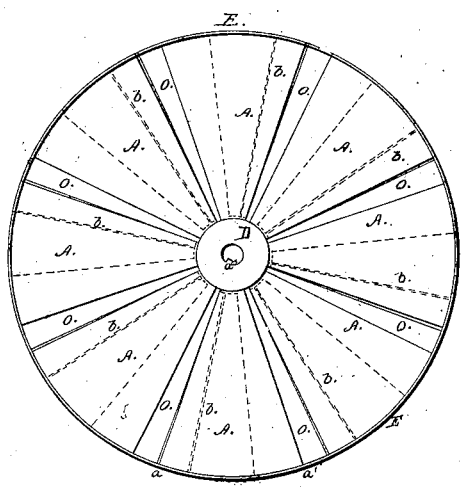
Figure 2:
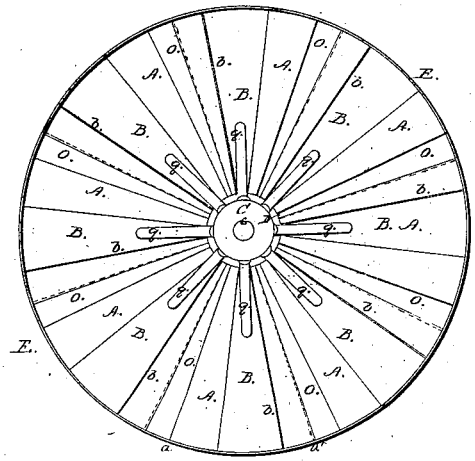
Figure 7:
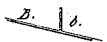

Figure 1 is a front elevation of my wheel; Fig. 2, a rear elevation of the same; Fig. 3, a view of the blades and shutters employed to close the spaces between the vanes. Figs. 4 and 5 are views of the shaft which carries the wheel; Fig. 6, a side view of the wheel with the parts connected therewith; Fig. 7, a section at X X of Fig. 3 of one of the blades employed to diminish the size of the wind-passages between the vanes.

The object of my present invention is to graduate the velocity of the wheel to the varying force of the wind by increasing or diminishing the openings between the vanes by means of shutters operated by the longitudinal motion of the wheel upon its carrying-shaft in a manner which will be presently described.

In the accompanying drawings, A are the blades or fans of the wheel, which are secured to the hub D and the rim E in the oblique position calculated to receive the best effect from the wind. These vanes are of a width represented by the distance $a$ $a'$, Figs. 1 and 2, the spaces O intervening between them being for the passage of the air.

Immediately behind the vanes A of the wheel are a set of secondary blades or vanes B. (Seen detached in Fig. 3 and in red in the rear view, Fig. 2. They are also represented by dotted lines in Fig. 1.) These blades are secured by means of the arms $q$ to a hub C.

$b$ are ribs or shutters which project from the rear of the blades B, Fig. 7.

The hubs C and D slide longitudinally upon their carrying-shaft G, a pin $a^3$ from the hub D of the wind-wheel entering the curved groove $a^2$, and a pin $c$ from the hub C entering the straight groove $c^2$ of the shaft. The wind-wheel, the blades B, and the shaft G are thus caused to revolve together.

F is a spiral spring, which encircles the shaft G and tends to force the wind-wheel and the hub C toward the end of the shaft, as seen in Fig. 6. In this position the blades B lie closely concealed behind the vanes A, as in Figs. 1 and 2, and the spaces O are wide open for the passage of the wind. When the force of the wind increases, the hubs D and C are both carried by the pressure upon the fans of the wheel back against the action of the spring F, the hub C moving back in a line parallel with the axis of the shaft. The wind-wheel, however, is caused to make a partial revolution with respect to the shaft as its hub recedes, and thus the blades B are brought opposite to the openings O between the fans of the wind-wheel, and these openings are more or less closed thereby. When the force of the wind becomes excessive, the openings O are entirely closed by the shutters $b$. It will thus be perceived that the size of the opening between the fans A will be inversely proportionate to the force of the wind, and that the velocity of the wheel will remain uniform whatever may be the varying force of the wind, the openings for the passage of the wind being diminished in proportion as the force of the wind augments. With a moderate wind these spaces are opened to their full extent, and when the wind becomes excessive they may be closed entirely or very nearly so.

If it be found necessary to graduate the spring F to the performance of a greater or less amount of work, this may be effected by causing its rear end to rest against a movable stop, the position of which may be regulated by hand or by a ball-governor actuated by the driving machinery. This, however, forms no part of my invention, and need not be further described. The shaft G runs in bearings K upon the upper portion of the turn-table, which revolves freely upon a lower plate or trough H', secured to the supporting tower or post J, a suitable number of balls or friction-rollers being interposed between the plates H H' to cause them to move freely upon each other.

The power may be communicated in any suitable manner from the shaft G to the machinery to be actuated.

The blades B may be guided by the straight groove $c^2$, as above described, while the wheel itself is caused to make a partial revolution with respect to the shaft; or the wheel may be guided by the straight groove and the blades B by the spiral groove. The method which I have represented and described above I consider to be the preferable of the two.

What I claim as my invention, and desire to secure by Letters Patent, is—

Regulating the velocity of the wind-wheel by means of the secondary blades B, operated in the manner substantially as herein set forth.

In testimony whereof I have hereunto subscribed my name this 30th day of May, A. D. 1855.

FRANCIS PEABODY.

Witnesses:
 SAM. COOPER,
 THOS. R. ROACH.